United States Patent [19]

Kelly et al.

[11] Patent Number: 4,769,289
[45] Date of Patent: Sep. 6, 1988

[54] FREE-FLOWING PLURAL EXTRUDATES OF POLAR ETHYLENE INTERPOLYMERS

[75] Inventors: Laura A. Kelly, Clute; Kenneth L. Bryce, San Antonio, both of Tex.

[73] Assignee: The Dow Chemical Company, Midland, Mich.

[21] Appl. No.: 775,561

[22] Filed: Sep. 13, 1985

[51] Int. Cl.$^4$ .............. B32B 5/16; B05D 7/00; B28B 21/54; D01F 1/02

[52] U.S. Cl. .................. 428/404; 427/222; 427/430.1; 425/407; 264/141; 264/142; 264/177.17; 264/178 R; 264/211; 264/211.13

[58] Field of Search ............... 427/222, 430.1, 434.2, 427/434.5

[56] References Cited

U.S. PATENT DOCUMENTS

| | | | |
|---|---|---|---|
| 2,431,873 | 12/1947 | Kennelly | 106/287.34 |
| 2,882,254 | 4/1959 | Kloepfer et al. | 260/41 |
| 3,324,060 | 6/1967 | Scopp et al. | 260/23 |
| 3,528,841 | 9/1970 | Donaldson et al. | 427/222 |
| 3,595,827 | 7/1971 | Foster | 260/32.6 |
| 3,753,965 | 8/1973 | Loomey et al. | |
| 3,901,992 | 8/1975 | Payne et al. | 428/96 |
| 3,916,058 | 10/1975 | Vossos | 428/241 |
| 3,931,428 | 1/1976 | Reick | 428/331 |
| 3,935,124 | 1/1976 | Thene et al. | 252/382 |
| 3,937,676 | 2/1976 | Shonebarger | 260/23 |
| 4,129,717 | 12/1978 | Praetorius et al. | 528/421 |
| 4,212,918 | 7/1980 | Marquisee | 428/404 |
| 4,264,554 | 4/1981 | Hale et al. | 264/130 X |
| 4,412,025 | 10/1983 | Corwin et al. | 524/100 X |
| 4,430,289 | 2/1984 | McKinney et al. | 524/232 X |
| 4,551,498 | 11/1985 | Yealer et al. | 524/424 |
| 4,663,383 | 5/1987 | Lowe et al. | 524/493 |

FOREIGN PATENT DOCUMENTS 1401236 7/1975 United Kingdom .

Primary Examiner—John E. Kittle
Assistant Examiner—Susan S. Rucker
Attorney, Agent, or Firm—Walter J. Lee

[57] ABSTRACT

Free-flowing plural extrudates of a polar ethylene interpolymer, and method of preparing the same. The extrudates are essentially coated with about 0.001-2 percent, by weight of the composition, fumed silica, preferably about 0.025-0.05 weight percent. The fumed silica has an average primary particle size of about 5-25 millimicrons, a surface area of about 200-250 m$^2$/g, and is substantially amorphous and non-porous. The interpolymer has interpolymerized therein polar monomer, such as acrylic acid, n-butyl acrylate, vinyl acetate, or the like, in an amount so that the untreated extrudates have high block. The extrudates are treated by admixture with the silica or by contact with an aqueous dispersion of about 0.01-10 wt. % silica. When the interpolymer contains $\alpha,\beta$-ethylenically unsaturated carboxylic acid, the extrudates are optionally surface neutralized with a base.

20 Claims, No Drawings

FREE-FLOWING PLURAL EXTRUDATES OF POLAR ETHYLENE INTERPOLYMERS

FIELD OF THE INVENTION

This invention relates to plural extrudates of ethylene interpolymers containing interpolymerized polar monomer which are treated to inhibit their inherent high blocking tendency, and to a method of preparing the same.

BACKGROUND OF THE INVENTION

Interpolymers of ethylene and one or more polar monomers, such as acrylic acid, methacrylic acid and vinyl acetate, are well known. Such interpolymers are commonly produced, sold and shipped in pelletized form, or as plural extrudates. However, the high block, or the tendency to stick or clump together, of pellets made of such interpolymers has been a serious problem in transporting these products, both locally and to remote destinations, particularly with such interpolymers containing a relatively high proportion of interpolymerized polar monomer.

One attempt at solving this problem, when the polar monomer was an $\alpha,\beta$-ethylenically unsaturated carboxylic acid such as acrylic acid, was to surface neutralize the carboxyl groups of the interpolymer pellets or chips with a basic solution such as aqueous alkali metal hydroxide or carbonate, ammonia, or aqueous amine, as described in U.S. Pat. No. 3,753,965. However, over a period of time, typically about 3 months, the neutralizing cation migrated from the surface to the interior of the pellet or chip, reactivating the surface acid groups. In addition, any surface distortion, such as might occur from erosion or breakage of the pellets during pneumatic conveying, or upon repeated heating and cooling, exposed unneutralized acid groups, resulting in an increased tendency of the pellets to clump together. Moveover, if an excessive fraction of the acid groups were neutralized, properties of the interpolymer, such as melt flow value, strength, stiffness, hardness, and softening point, were substantially adversely affected.

Another attempt was the employment of powdered anti-clumping agents such as talc, calcium carbonate, and the like. When such materials were either intimately blended with the interpolymer or admixed with the pellets in an effective amount, the properties of the interpolymer, such as stiffness and, in the case of aqueous dispersible grade resins, dispersibility, were substantially adversely affected. Moreover, it was difficult to accurately admix these additives in the desired proportions and to obtain sufficient mixing to ensure that the surfaces of the pellets were adequately coated.

Other references which may be relevant to this application include: U.S. Pat. Nos. 3,595,827; 3,935,124; 2,882,254; 3,324,060; 3,901,992; 3,916,058; 4,129,717; and U.S. Pat. No. 3,937,676.

SUMMARY OF THE INVENTION

Briefly, the invention is a free-flowing plural extrudate composition of polar ethylene interpolymers. The composition includes: (a) plural extrudates of ethylene interpolymers having interpolymerized therein ethylene and polar monomer selected from the group consisting of: $\alpha,\beta$-ethylenically unsaturated carboxylic acids having 3-8 carbon atoms and alkyl esters thereof, vinyl esters of carboxylic acids, and combinations thereof; and (b) essentially surface coated on the extrudates, fumed silica having an average primary particle size between about 5 and about 25 millimicrons, in an amount effective to impart substantially free-flowing characteristics to the extrudates.

The invention is also a method of preparing free-flowing plural extrudates of polar ethylene interpolymers. The method includes the steps of: (a) forming plural extrudates of ethylene interpolymers having interpolymerized therein ethylene and polar monomer selected from the group consisting of: $\alpha,\beta$-ethylenically unsaturated carboxylic acids having 3-8 carbon atoms and alkyl esters thereof, vinyl esters of carboxylic acids, and combinations thereof; and (b) essentially surface treating the extrudates with fumed silica having an average primary particle size between about 5 and about 25 millimicrons and in an amount effective to impart free-flowing characteristics to the extrudates. The surface treating is effected by admixing the fumed silica with the extrudates, or preferably by contacting the extrudates with an aqueous dispersion of the fumed silica during formation of the extrudates.

The composition of the present invention is free-flowing, retains its free-flowing characteristics over long periods, and substantially retains the physical properties of the untreated interpolymer.

DESCRIPTION OF THE PREFERRED EMBODIMENTS

The plural extrudates of the invention may be formed by extruding the molten interpolymer through a die to form one or more strands, subsequently cooling the strands in a water bath, and finally chopping the strands into pellets. The plural extrudates may also be, and preferably are, formed by underwater pelletization in which the strands are extruded directly into a water bath and cut at the die face. As used herein, the term "plural extrudates" encompasses the interpolymer in similar forms, which but for the high block of the interpolymer would be free flowing, such as, for example, rods, bricks, chips, chicklets, and the like, whether formed by extrusion or other means.

The interpolymers from which the plural extrudates are formed contain interpolymerized ethylene and one or more polar monomers selected from the group consisting of: $\alpha,\beta$-ethylenically unsaturated carboxylic acids having 3-8 carbon atoms and alkyl esters thereof, vinyl esters of carboxylic acids, and combinations thereof. Specific representative examples of such unsaturated carboxylic acids include acrylic acid, methacylic acid, ethacrylic acid, crotonic acid, isocrotonic acid, angelic acid, senecioic acid, tiglic acid, maleic acid, fumaric acid and the like. Specific representative examples of alkyl esters of these acids include the methyl, ethyl, n-propyl, i-propyl, n-butyl, i-butyl, sec-butyl, and t-butyl esters and half-esters thereof. Specific representative examples of such vinyl esters of carboxylic acids include vinyl formate, vinyl acetate, vinyl propionate, vinyl butyrate, vinyl isobutyrate, vinyl valerate, vinyl isovalerate, and the like.

In addition, the interpolymers containing interpolymerized $\alpha,\beta$-ethylenically unsaturated carboxylic acid may be ionomers in which 0-100 percent of the carboxyl groups are neutralized with a cation. Exemplary of such cations are: alkali metals such as sodium, potassium, lithium and the like; ammonium ions; and organic amines such as alkyl amines, alkanol amines and the like.

The minimum amount of polar monomer interpolymerized in the ethylene interpolymer is not critical, except that there will usually be no advantage in using the present invention unless the interpolymerized polar monomer content is such that the untreated plural extrudates formed therefrom exhibit a blocking tendency. In general, a blocking tendency is observed when the interpolymerized polar monomer content is about 4 mole percent or more.

In addition, the ethylene interpolymer may contain relatively minor amounts of additional polar or nonpolar monomers interpolymerizable with ethylene, such as, for example, carbon monoxide, α-olefins such as propylene, 1-butene, 1-pentene, 1-hexene, 1-octene, 1-decene and the like. Such additional monomers do not substantially reduce or increase blocking tendency of the interpolymer.

The molecular weight of the interpolymers is not critical, but will normally be sufficient to form plural extrudates. Depending on the specific monomers, the interpolymers will typically have a melt flow value from about 0.1 to about 3000 dg/min per ASTM D-1238, condition 190° C./2.160 kg (condition E), but may be more or less than this. Similarly, other properties of the interpolymer are not particularly critical to the utility of the invention and will depend on the intended end use and application. Such interpolymers and the methods of preparing them and forming them into plural extrudates are well known.

The plural extrudates are essentially surface treated or coated with fumed silica in an amount effective to impart free-flowing characteristics thereto, preferably from about 0.001 to about 2 percent by weight of the composition, and more especially from about 0.025 to about 0.05 percent by weight. Fumed silica is a well-known colloidal form of silica made by, for example, the combustion of silicon tetrachloride or silicone tetrafluoride in a hydrogen-oxygen furnace. Fumed silica may also be chemically modified, for example, by alkylation or hydroxylation. The fumed silica useful in the present invention may be either modified or unmodified, and has an average primary particle size between about 5 and about 25 millimicrons, a surface area of from about 200 to about 250 $m^2/g$, and is substantially amorphous and non-porous. Such fumed silica is available commercially for example, from Cabot Corporation under the designations M-5, T-500 and N70-TS.

When the interpolymer includes interpolymerized α,β-ethylenically unsaturated carboxylic acid and is in a substantially non-ionomeric form, or only partially ionomerized, the plural extrudates are optionally surface-neutralized with cations to react the surface carboxyl groups to form salts. Exemplary cations include: alkali metals such as lithium, sodium, potassium and the like; ammonium ions; and organic amines such alkyl amines, alkanol amines and the like. Such surface neutralization enhances the anti-blocking effect of the fumed silica, and does not adversely affect the ability of the fumed silica to coat the extrudate surfaces. In contrast to the known methods in which surface neutralization is the sole means of reducing block, however, it is not necessary to surface neutralize the extrudates to the extent that the properties of the interpolymer are adversely affected.

In preparing the free-flowing plural extrudates of the invention, plural extrudates are formed from the interpolymer and essentially surface treated with the fumed silica. In one embodiment the surface treating is effected by admixing the fumed silica with the plural extrudates in the aforementioned proportions with any suitable equipment, such as in a dry blender or by metering the fumed silica into the extrudate pneumatic conveying system.

In an especially preferred embodiment, the extrudates are contacted with an aqueous dispersion of hydrophilic fumed silica. The aqueous dispersion may contain the fumed silica in an amount of from about 0.01 to about 10 percent by weight of the dispersion, preferably from about 0.8 to about 1.1 percent by weight. Because of the size and nature of the fumed silica particles, it is not necessary to employ any dispersants, emulsifiers or similar additives, which may adversely affect the properties of the interpolymer, to prepare the aqueous fumed silica dispersion. Exemplary of suitable hydrophilic fumed silica is hydroxylated fumed silica obtained from Cabot Corporation under the designation M-5.

When the plural extrudates are treated by contact with an aqueous dispersion of the fumed silica, they may be simply immersed in or sprayed with the dispersion and subsequently dried. Preferably, such contact is made by employing the aqueous silica dispersion as the quench medium in the conventional water bath for cooling the strands formed during the formation of the plural extrudates or for cooling the pellets formed during underwater pelletization. This method has the advantage of eliminating any separate admixing step, and the readily prepared fumed silica dispersion facilitates accurate measurement of the amount of the fumed silica coated on the pellets and ensures an adequate and more uniform coating on substantially all of the pellets.

Optionally, the plural extrudates of the ethylene interpolymers having α,β-ethylenically unsaturated carboxylic acid interpolymerized therein may also be surface neutralized by contact with a base. Such bases include alkali metal hydroxides, carbonates, and phosphates; ammonia; and organic amines. When the surface treating with fumed silica is by contact of the extrudates with an aqueous dispersion of fumed silica, the dispersion may also contain the base, preferably in an amount sufficient so that the pH of the dispersion is from about 10 to about 12. An especially preferred base is trisodium phosphate. It has been found that when the silica dispersion also contains a base, the wear on the knife blades used to cut the interpolymer strands during pelletization is generally reduced.

The plural extrudates treated in accordance with the invention are substantially free-flowing, even at the temperatures experienced in storage silos and hopper cars. In addition, the plural extrudates remain free-flowing for longer periods of time and substantially resist reduction in their free-flowing characteristics upon deformation and/or breakage during handling. It is believed that this improved retention of the free-flowing characteristic is due to a physical mechanism rather than a chemical mechanism as in surface neutralization techniques heretofore employed. The fumed silica is believed to form a barrier of dust on the surface of each pellet, providing a graphite-like lubricating action which allows the pellets to freely slide past each other, rapidly coating any newly exposed surfaces. Moreover, the substantial absence of any change in the properties of the interpolymer observed when the plural extrudates are put to an end use is believed to result from the minute size of the fumed silica particles and the relatively small proportion of the fumed silica which is effective to impart the free-flowing characteristics to the plural extrudates.

The practice and utility of the invention is illustrated by way of the following examples:

1-2, but with an aqueous solution of 0.95 wt. % trisodium phosphate containing no fumed silica.

The preparation of the above Examples and Comparatives is summarized in Table I.

TABLE I

| Example/Comparative | Interpolymer Composition | Fumed Silica Trade Designation | Wt % Fumed Silica In Treated Composition | Treatment Method |
|---|---|---|---|---|
| Example 1 | 80.1 wt. % Ethylene 19.9 wt. % Acrylic Acid | M-5 | ~0.013 | 0.47 wt. % aq. dispersion |
| Example 2 | 80.1 wt. % Ethylene 19.9 wt. % Acrylic Acid | M-5 | ~0.019 | 0.95 wt. % aq. dispersion |
| Example 3 | 80.1 wt. % Ethylene 19.9 wt. % Acrylic Acid | M-5 | ~0.025 | Dry blending |
| Example 4 | 80.1 wt. % Ethylene 19.9 wt. % Acrylic Acid | M-5 | ~0.05 | Dry blending |
| Comparative 1 | 80.1 wt. % Ethylene 19.9 wt. % Acrylic Acid | — | — | None |
| Comparative 2 | 80.1 wt. % Ethylene 19.9 wt. % Acrylic Acid | — | — | Surface neutralized with 0.95 wt % aq. $Na_3PO_4$ |

EXAMPLE 1

A 500 g sample of pellets of an ethylene-acrylic acid interpolymer containing 19.9 wt. % acrylic acid and having a melt flow value of 15 dg/min per ASTM D-1238 condition 125° C./2.16 kg (condition B) was placed in a two liter beaker with an aqueous dispersion containing 0.47 wt. % hydrophilic fumed silica obtained from Cabot Corporation under the designation M-5 (average particle size 10 millimicrons, surface area 200 $m^2/g$, chemical formula $(SiO_2)_{11600}OH_{1000}$, bulk density 0.03 g/cc). The pellets measured approximately 0.4 cm in diameter by 0.6 cm long. After about three minutes of contact at ambient temperature (23° C.±1°), the dispersion was drained from the pellets. The treated pellets were spread on an aluminum sheet, dried in a forced-draft oven at about 50° C., and allowed to cool to room temperature. The treated pellets contained about 130 ppm fumed silica.

EXAMPLE 2

Pellets having the same characteristics as those treated in Example 1 were treated as in Example 1, but with an aqueous dispersion containing 0.95 wt. % of the M-5 fumed silica. The treated pellets contained about 190 ppm fumed silica.

EXAMPLE 3

Pellets having the same characteristics as those treated in Examples 1-2 were treated by admixing therewith about 250 ppm of the M-5 fumed and dry blending for about one hour in a conventional tumbler.

EXAMPLE 4

Pellets having the same characteristics as those treated in Examples 1-3 were treated by admixing therewith about 500 ppm of the M-5 fumed silica as in Example 3.

COMPARATIVE 1

Comparative 1 is a sample of untreated pellets having the same characteristics as those treated in Examples 1-4.

COMPARATIVE 2

Pellets having the same characteristics as those treated in Examples 1-4 were treated as in Examples

Blocking Measurements

A drop test was used to determined the extent of pellet blocking. 3.5 grams of pellets to be tested were placed in a 13.2 mm I.D. poly(methylmethacrylate) cylinder with an open end. A 12.7 mm O.D. poly(methylmethacrylate) rod was inserted in the cylinder on top of the pellets and a 488 g weight was placed on the rod pushing down on the pellets. (This weight was selected to simulate the force exerted on pellets at the bottom of a filled 6.1 m silo.) The whole apparatus was heated and maintained at 50° C. for a predetermined length of time. (This temperature was selected to simulate the estimated maximum temperature in silos and hopper cars.) The cylinder was then removed from the oven, inverted and dropped at an initial height of 1.27 cm, and then at heights sequentially increased by 1.27 cm, until the pellets were dislodged completely. For each of the Examples 1-4 and Comparatives 1-2, the average value of six tests is reported as the drop height in Table II.

TABLE II

| Comparative/Example | DROP TEST VALUE[1] (cm) Aging Period at 50° C. (hrs)[2] | | |
|---|---|---|---|
| | 0.5 | 1.0 | 2.0 |
| Comparative 1 | 23 ± 8 | 25 ± 5 | >63.5 |
| Comparative 2 | 8 ± 3 | 11 ± 2 | 25 ± 13 |
| Example 1 | 8 ± 3 | 16 ± 13 | 46 ± 15 |
| Example 2 | 5 ± 2 | 3 ± 2 | 18 ± 10 |
| Example 3 | 7 ± 2 | 7 ± 1 | 13 ± 10 |
| Example 4 | 1 ± 1 | 2 ± 1 | 2 ± 1 |

Notes for Table II:
[1] Error calculated as one standard deviation.
[2] As described in the paragraph entitled "Blocking Measurements".

As seen in Table II, the treated pellets of Examples 1-4 showed a marked reduction in block in comparison with the untreated pellets (Comparative 1), and with the exception of Example 1, a significant reduction in block in comparison with the pellets treated only by surface-neutralization (Comparative 2).

Physical Properties

The utility of the invention is further illustrated by the substantial absence of any effect on the physical properties of the pellets treated according to the invention in comparison with the untreated pellets.

TABLE III

| Physical Property | Com. 1 | Com. 2 | Ex. 1 | Ex. 2 | Ex. 3 | Ex. 4 |
|---|---|---|---|---|---|---|
| Melt Flow Value[1] (dg/min) | 14.6 | 13.2 | 14.5 | 14.2 | 14.6 | 14.6 |
| Ultimate Tensile Strength[2] (MN/m$^2$) | 10.1 | 10.0 | 10.3 | 10.1 | 9.89 | 9.38 |
| Yield Strength[3] (MN/m$^2$) | 4.72 | 4.90 | 4.69 | 4.62 | 4.69 | 4.48 |
| Elongation[4] (%) | 415 | 345 | 395 | 365 | 370 | 400 |
| Izod Impact[5] (N-m/cm notch) | 0.16 | — | — | — | 0.16 | 0.16 |
| Tensile Impact[6] (N-m/cm$^2$) | 41.0 | 39.5 | 42.9 | 39.1 | 40.3 | 30.7 |
| Density (g/cm$^3$) | 0.955 | 0.957 | 0.955 | 0.956 | 0.956 | 0.956 |
| Hardness[7] (Shore D) | 40 | — | — | — | 40 | 45 |
| 2% Secant Modulus[8] (N/m$^2$) | 0.269 | — | — | — | 0.262 | 0.262 |
| Flex Modulus[9] (N/m$^2$) | 0.317 | — | — | — | 0.310 | 0.290 |
| Vicat Softening Point[10] (°C.) | 44 | — | — | — | 44 | 44 |

Notes for Table III:
[1]Per ASTM D-1238 condition 125° C./2.16 kg (condition B).
[2]Per ASTM D-638.
[3]Per ASTM D-638.
[4]Per ASTM D-638.
[5]Per ASTM D-256-58.
[6]Per ASTM D-1882.
[7]Per ASTM D-2240.
[8]Per ASTM D-790.
[9]Per ASTM D-790.
[10]Per ASTM D-1525.

As illustrated in Table III, the pellets treated with the fumed silica exhibited a melt index similar to that of the untreated pellets, whereas the surface-neutralized pellets exhibited a slight reduction. With the exception of the slightly lower ultimate tensile strength of Example 4, the physical properties of the treated pellets, regardless of the treatment method, are similar to those of the untreated pellets.

Dispersibility

The utility of the invention is further similarly illustrated by the insubstantial effect of treatment on the aqueous dispersibility of dispersible grade resins as seen in Table IV.

TABLE IV

| Comparative/Example | Wt. % Solids | Wt. % Non-Dispersible | Ambient viscosity (cp) | pH |
|---|---|---|---|---|
| Comparative 1 | 24.9 | 0.09 | 110 | 8.85 |
| Comparative 2 | 24.6 | 0.11 | 105 | 9.02 |
| Example 1 | 24.9 | 0.09 | 120 | 8.90 |
| Example 2 | 21.1 | 0.09 | 130 | 8.99 |
| Example 3 | 24.6 | 0.08 | 90 | 8.90 |
| Example 4 | 24.2 | 0.09 | 142 | 8.98 |

DISPERSION PROPERTIES[1]

Note for Table IV:
[1]Dispersed in 0.95 wt. % NH$_3$ aqueous solution at 95° C.

Optical Properties

Pellets having the same characteristics as those treated in Examples 1-4 were dry blended as in Examples 3-4 with 0, 0.2, 0.25, 1.0 and 3.0 phr of the M-5 fumed silica. The treated pellets were dispersed in 0.95 wt. % aqueous ammonia at 95° C. to obtain a dispersion of about 25 wt. % solids. The dispersions were cast into three-layer films with a number 22 Meyer rod, and cured in a 90° C. oven for 5 minutes per layer. The cast films were about 0.025 mm thick. The cast films were evaluated for clarity, gloss and haze, and the results are presented in Table V.

TABLE V

| Fumed Silica (phr) | Clarity[1] | 20° Gloss[2] | 45° Gloss[3] | Haze[4] |
|---|---|---|---|---|
| 0 | 79 | 177 | 106 | 3.3 |
| 0.2 | 76 | 177 | 107 | 3.3 |
| 0.25 | 80 | 175 | 107 | 3.5 |
| 1.0 | 74 | 169 | 107 | 3.2 |
| 3.0 | 74 | 142 | 106 | 3.3 |

Notes for Table V:
[1]Per ASTM D-2457.
[2]Per ASTM D-2457.
[3]Per ASTM D-2457.
[4]Per ASTM D-1003.

As seen in Table V, when the pellets are treated with an effective amount of the fumed silica according to the invention, the optical properties of film coatings remain substantially unchanged in comparison with those of the untreated pellets. At higher silica concentrations, gloss and clarity begin to decrease, and haze begins to increase.

Heat Seal Strength Properties

Kraft paper and 0.051-mm aluminum sheets were heat sealed with films cast from the dispersions reported in Table IV. The films were cast according to the procedure described for the films reported in Table V. The cast films were placed between substrate sheets and heat sealed face-to-face at two conditions: (1) at 93° C. for 1 second at 1.41 kg/cm$^2$; and (2) at 116° C. for 5 seconds at 2.82 kg/cm$^2$. Strips 2.54 cm wide were peel tested with a tensiometer at 50.8 cm/min per ASTM D-903-49. The results are presented in Table VI.

TABLE VI

| Example/Comparative | Paper[2] | Aluminum[2] | Paper[3] | Aluminum[3] |
|---|---|---|---|---|
| Comparative 1 | 0.643[4] | 1.14 | 1.07[4] | 2.04 |
| Comparative 2 | 0.857[4] | 1.64 | 1.05[4] | 1.75 |
| Example 1 | 0.821[4] | 1.64 | 1.14[4] | 1.79 |
| Example 2 | 0.714[4] | 1.50 | 1.18[4] | 1.68 |
| Example 3 | 0.750[4] | 1.43 | 1.11[4] | 1.82 |
| Example 4 | 0.821[4] | 1.36 | 1.11[4] | 1.71 |

Heat Seal Strength[1] (kg/cm width)

Notes for Table VI:
[1]Per ASTM D-903-49.
[2]Heat sealed at 93° C., 1.41 kg/cm$^2$, 1 s dwell.
[3]Heat sealed at 116° C., 2.81 kg/cm$^2$, 5 s dwell.
[4]Sample tear.

As seen in Table VI, the heat seal strength of films cast from dispersions of the treated pellets was comparable to (even slightly improved in some instances) the heat seal strength of the untreated pellets (Comparative 1) and the pellets only surface-neutralized (Comparative 2).

While we have desribed our invention above, many other variations will occur to those skilled in the art. It is intended that all such variations which fall within the scope and spirit of the appended claims be embraced thereby.

We claim:

1. A method of preparing free-flowing plural extrudates of a polar ethylene interpolymer, comprising the steps of:
   (a) forming plural extrudates of an ethylene interpolymer having interpolymerized therein ethylene and polar monomer selected from the group consisting of: α,β-ethylenically unsaturated carboxylic acids having 3-8 carbon atoms and alkyl esters thereof, vinyl esters of carboxylic acids, and combinations thereof; and (b) essentially surface treating said extrudates with an effective amount of fumed silica having an average primary particle size between about 5 and about 25 millimicrons to impart free-flowing characteristics thereto.

2. The method of claim 1, wherein said amount of said fumed silica is from about 0.001 to about 2 percent by weight of the free-flowing composition.

3. The method of claim 2, wherein said surface treating includes admixing said fumed silica with said extrudates.

4. The method of claim 2, wherein said surface treating includes contacting said extrudates with an aqueous dispersion of said fumed silica.

5. The method of claim 1, wherein said aqueous dispersion contains from about 0.01 to about 10 percent, by weight of said dispersion, of said fumed silica.

6. The method of claim 1, wherein said interpolymer has interpolymerized therein $\alpha,\beta$-ethylenically unsaturated carboxylic acid having 3-8 carbon atoms, and wherein said method further comprises contacting said extrudates with a base solution.

7. The method of claim 6, wherein said base is present in said solution in an amount sufficient to provide a pH thereof of from about 10 to about 12.

8. The method of claim 7, wherein said base is selected from the group consisting of:
alkali metal hydroxides, alkali metal carbonates, alkali metal phosphates, ammonia, organic amines, and combinations thereof.

9. The method of claim 7, wherein said base is trisodium phosphate.

10. A method of preparing free-flowing plural extrudates of a polar ethylene interpolymer, comprising the steps of:

(a) extruding through a die to form a strand an ethylene interpolymer having interpolymerized therein ethylene and polar monomer selected from the group consisting of: $\alpha,\beta$-ethylenically unsaturated carboxylic acids having 3-8 carbon atoms and alkyl esters thereof, vinyl esters of carboxylic acids, and combinations thereof;

(b) cooling said strand by contact thereof with an aqueous dispersion containing from about 0.01 to about 10 percent, by weight of said dispersion, hydrophilic fumed silica having an average primary particle size between about 5 and about 25 millimicrons and a surface area of from about 200 to about 250 m$^2$/g, said fumed silica particles being substantially amorphous and non-porous; and (c) cutting said strand into substantially free-flowing plural extrudates.

11. The method of claim 10, wherein said interpolymer has interpolymerized therein $\alpha,\beta$-ethylenically unsaturated carboxylic acid having 3-8 carbon atoms, and wherein said dispersion contains a base.

12. The method of claim 11, wherein said base is present in said dispersion in an amount sufficient to provide a pH thereof of from about 10 to about 12.

13. The method of claim 12, wherein said base is selected from the group consisting of:
alkali metal hydroxides, alkali metal carbonates, alkali metal phosphates, ammonia, organic amines, and combinations thereof.

14. The method of claim 12, wherein said base is trisodium phosphate.

15. The method of claim 12, wherein said cutting of said strand is underwater in said dispersion at the face of said die.

16. The method of claim 10, wherein said fumed silica is hydroxylated.

17. The method of claim 10, wherein said aqueous dispersion contains from about 0.8 to about 1.1 percent by weight of said dispersion of said fumed silica.

18. A method of preparing free-flowing plural extrudates of a polar ethylene interpolymer, comprising the steps of:

(a) forming plural extrudates of an ethylene interpolymer having interpolymerized therein ethylene and polar monomer selected from the group consisting of: $\alpha,\beta$-ethylenically unsaturated carboxylic acids having 3-8 carbon atoms and combinations thereof; and (b) contacting said extrudates with an aqueous dispersion containing from about 0.01 to about 10 percent, by weight of dispersion, hydroxylated fumed silica having an average primary particle size between about 5 and about 25 millimicrons and a surface area of from about 200 to about 250 m$^2$/g, said fumed silica being substantially amorphous and non-porous, and a base in an amount sufficient to obtain a dispersion pH of from about 10 to about 12 selected from the group consisting of: alkali metal hydroxides, alkali metal phosphates, ammonia, organic amines and combinations thereof.

19. The method of claim 18, wherein said base is trisodium phosphate.

20. The method of claim 18, wherein said aqueous dispersion contains from about 0.8 to about 1.1 percent of said fumed silica by weight of said dispersion.

* * * * *